US006805152B2

(12) United States Patent
Kanzaka et al.

(10) Patent No.: US 6,805,152 B2
(45) Date of Patent: Oct. 19, 2004

(54) POPPET VALVE WITH HEATER

(75) Inventors: Ikuo Kanzaka, Tsukuba-gun (JP); Mamoru Fukuda, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/657,159

(22) Filed: Sep. 9, 2003

(65) Prior Publication Data

US 2004/0089344 A1 May 13, 2004

(30) Foreign Application Priority Data

Nov. 7, 2002 (JP) ....................................... 2002-323808

(51) Int. Cl.[7] ................................................ F16K 49/00

(52) U.S. Cl. ...................... 137/341; 137/338; 251/63.5; 251/335.3

(58) Field of Search ................................ 137/341, 338; 251/63.5, 335.3

(56) References Cited

U.S. PATENT DOCUMENTS 5,678,595 A * 10/1997 Iwabuchi .................... 137/341
5,915,410 A * 6/1999 Zajac ...................... 251/335.3
6,321,780 B1 * 11/2001 Iwabuchi .................... 137/341
6,478,043 B2 * 11/2002 Ishigaki ..................... 251/63.6
6,668,854 B2 * 12/2003 Fukuda .................... 251/335.3
6,708,721 B2 * 3/2004 Fukuda et al. .............. 137/341

FOREIGN PATENT DOCUMENTS

JP 11-82807 3/1999
JP 3005449 11/1999
JP 3012831 12/1999

OTHER PUBLICATIONS

U.S. patent application Ser. No. 10/277,832, Kanzaka et al., filed Oct. 23, 2002.
U.S. patent application Ser. No. 10/657,159, Kanzaka et al., filed Sep. 9, 2003.

* cited by examiner

*Primary Examiner*—Kevin Lee
(74) *Attorney, Agent, or Firm*—Oblon, Spivak, McClelland, Maier & Neustadt, PC

(57) ABSTRACT

A cylindrical heat-generating member is disposed in a valve casing including a valve seat in a flow path connecting main ports, a valve member for opening and closing the valve seat, and a rod connecting the valve member and a piston. A first heater is mounted in the heat-generating member. The heat-generating member and a heat receiving member of the valve member are connected to each other by a heat-transfer member for expansion and contraction. As a result, the valve member is constantly heated through the heat-transfer member irrespective of its open/closed position. When the valve member is open, the heat receiving member comes in contact with the heat-generating member and the valve member is directly heated.

15 Claims, 2 Drawing Sheets

POPPET VALVE WITH HEATER

TECHNICAL FIELD

The present invention relates to a poppet valve directly used for supplying working fluid such as source gas in physical and chemical machines and the like or used for reducing pressure in a vacuum chamber using such source gas and more specifically relates to a poppet valve with a heater and constituted such that adhesion of a product from the working fluid to a valve member and the like is prevented by the heater.

PRIOR ART

In a manufacturing apparatus of a semiconductor, for example, high-temperature source gas is used for chemical treatment such as etching carried out in a vacuum chamber and a poppet valve is used for supplying the source gas or for reducing pressure in the vacuum chamber. However, a product is likely to be precipitated from the source gas when a temperature of the source gas becomes low and the product adheres to a valve member for opening and closing a flow path to reduce an opening/closing accuracy. Therefore, it is important that such a poppet valve is constituted to be able to prevent precipitation of the product from the working fluid, adhesion of the product to the valve member, and the like.

Therefore, conventionally, a poppet valve with a heater in which an inside of a casing, a valve member, and the like are heated by a heater to prevent adhesion of a product has been proposed. There is one disclosed in Japanese Patent No. 3005449 in which a band heater is wound around an outer face of the casing and a rod-shaped heater is mounted to a valve member for opening and closing a flow path through an inside of a hollow rod extending from the valve member. There is also one disclosed in Japanese Patent No. 3012831 in which a rubber heater is mounted to an outer face of a casing and another heater is mounted to an outer periphery of a retaining body in a shape of a cylinder integral with a valve member.

However, if a large heater with such a large heat capacity as to be able to sufficiently heat the valve member on its own is mounted to the valve member which is a movable member like in the above-described conventional poppet valves, weight of the valve member is increased by the heater. As a result, a driving force required for opening and closing has to be increased and responsiveness is likely to reduce. Therefore, it is desired that the heater is not directly mounted to the valve member but is disposed at a place other than the valve member where possible to be able to always heat the valve member by the heater irrespective of an operating position.

DISCLOSURE OF THE INVENTION

It is a technical object of the present invention to provide a poppet valve which has a heater for heating a valve member and in which the heater is not directly mounted to the valve member but is disposed at a place other than the valve member to be able to always heat the valve member by the heater irrespective of open/closed positions.

To achieve the object, according to the invention, there is provided a poppet valve with a heater, the valve comprising: a valve casing including a first main port and a second main port, a flow path connecting both the main ports, and a valve seat provided in the flow path; a cylinder connected to the valve casing; a poppet-type valve member provided in the valve casing to open and close the valve seat; a rod having a tip end portion connected to the valve member and a base end portion on an opposite side and extending into the cylinder; a piston disposed for sliding in the cylinder and connected to the base end portion of the rod; a heat-generating member disposed in a fixed position in the valve casing and having at its tip end portion a heat-transfer face with which the valve member comes in contact in an open position; a heat-transfer member disposed for expansion and contraction in response to an operation of the valve member between the heat-generating member and the valve member to constantly transfer heat from the heat-generating member to the valve member; and a first heater mounted to the heat-generating member.

In the poppet valve of the invention and having the above structure, the heat-generating member is disposed in the fixed position in the valve casing, the first heater is mounted to the heat-generating member, the heat-generating member and the valve member are connected to each other by the heat-transfer member for expansion and contraction, and the heat-generating member and the valve member come in contact with each other in opening of the valve member. Therefore, even when the valve member is at the closed position or at some midpoint in the opening/closing operation and is at a distance from the heat-generating member, the valve member is constantly heated through the heat-transfer member and adhesion of the product from the working fluid can be prevented reliably. When the valve member is at the open position and a large amount of working fluid circulates through the flow path, the valve member comes in contact with the heat-generating member and is further and directly heated by the heat-generating member. Therefore, heating efficiency is increased and a product adhesion preventing effect is enhanced.

According to the poppet valve of the invention, in spite of a structure in which the heater for heating the valve member is disposed at the place other than the valve member, the valve member can constantly be heated by the heater irrespective of the open/closed position of the valve member. Moreover, it is possible to avoid problems such as an increase in a driving force for opening and closing and a degradation in responsiveness due to an increase in weight of the valve member, the problems occurring in a conventional product in which a heater is directly mounted to a valve member.

According to a detailed structural example of the invention, a cylindrical heat receiving member surrounding the rod and having a heat-transfer property is mounted to a back face of the valve member, a heat receiving face with which the heat-transfer face of the heat-generating member comes in contact is constituted at a tip end of the heat receiving member, and the heat-transfer member is connected to the heat receiving member and the heat-generating member.

According to another detailed structural example of the invention, the heat-generating member is in a cylindrical shape and disposed concentrically around the rod and the first heater is mounted in the heat-generating member.

In the invention, it is preferable that the heat-transfer member is in a shape of a bellows or a coil.

According to yet another detailed structural example of the invention, a bellows is provided between a partition at an end portion of the valve casing and the valve member to surround the rod and the heat-generating member, the heat receiving member, and the heat-transfer member are housed in the bellows.

In the invention, the valve casing may include a second heater.

BEST MODE FOR CARRYING OUT THE INVENTION

Figure 1:
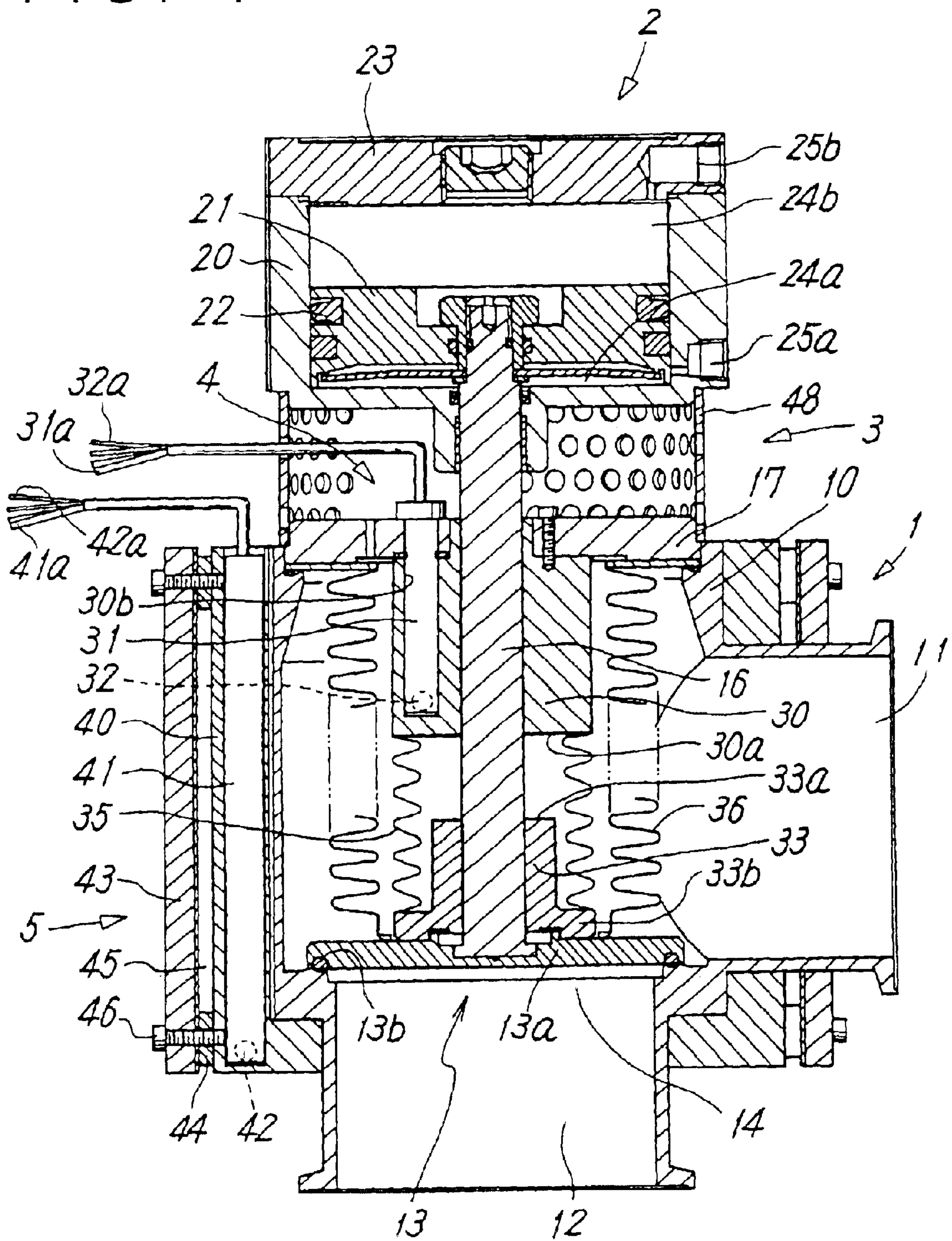
FIG. 1 is a sectional view of a closed state of an embodiment of a poppet valve according to the invention.
Figure 2:
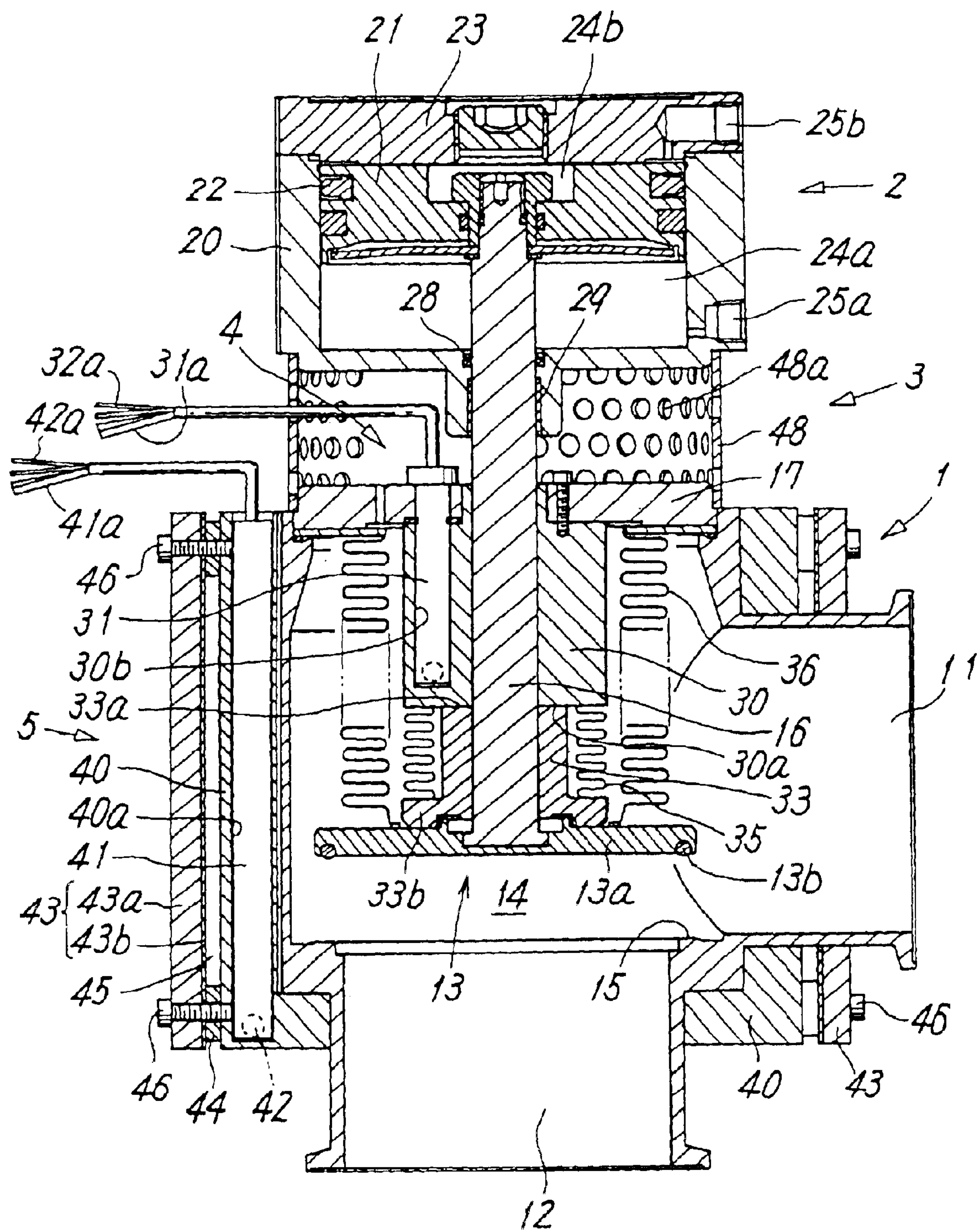
FIG. 2 is a sectional view of an open state of the poppet valve in FIG. 1.

FIGS. 1 and 2 show a desirable embodiment of a poppet valve with a heater and according to the invention. The poppet valve is suitable for use for reducing pressure in a vacuum chamber in a semiconductor manufacturing apparatus and includes a valve opening/closing portion 1 constituted to open and close a fluid flow path 14 with a valve member 13, a cylinder operating portion 2 for driving the valve member 13, and a heat insulating portion 3 provided between the valve opening/closing portion 1 and the cylinder operating portion 2. The valve opening/closing portion 1 is provided with first and second two heating mechanisms 4 and 5.

The valve opening/closing portion 1 has a valve casing 10 made of material such as stainless steel (SUS) in a shape of a square pole. The valve casing 10 has a first main port 11 to be connected to one of the vacuum chamber and a vacuum pump and a second main port 12 to be connected to the other, the first and second main ports 11 and 12 being in orientations at 90° from each other. The valve casing 10 also includes the flow path 14 connecting both the main ports 11 and 12 and an annular valve seat 15 provided in the flow path 14.

In the valve casing 10, the poppet-type valve member 13 for opening and closing the valve seat 15 is provided. The valve member 13 is constituted by mounting a rubber annular sealing member 13*b* for coming in contact with and separating from the valve seat 15 to an outer periphery of a lower face of a disc-shaped base 13*a*. A tip end portion of a driving rod 16 is mounted to a central portion of a back face of the valve member 13 and a base end portion of the rod 16 passes through a partition 17 at an end portion of the valve casing 10 and the heat insulating portion 3 and extends to the cylinder operating portion 2 to be connected to a piston 21.

On the other hand, the cylinder operating portion 2 has a cylinder 20 connected to an end portion of the valve casing 10 through the heat insulating portion 3. An end portion of the cylinder 20 on a side of the heat insulating portion 3 is closed with the partition 17 and an opposite end portion of the cylinder 20 is closed with a lid body 23. In the cylinder 20, the piston 21 is housed for sliding through a sealing member 22. The rod 16 passes through a central portion of the partition 17 to slide through a sealing member 28 and a guide member 29 and reaches the piston 21. On opposite sides of the piston 21, a first pressure chamber 24*a* and a second pressure chamber 24*b* are constituted and the pressure chambers 24*a* and 24*b* are respectively connected to a first operating port 25*a* and a second operating port 25*b* open in a side face of the cylinder 20.

When the first pressure chamber 24*a* is opened by the first operating port 25*a* to supply pressure fluid such as compressed air from the second operating port 25*b* into the second pressure chamber 24*b* as shown in FIG. 1, the piston 21 and the rod 16 move forward. Therefore, the valve member 13 at the tip end of the rod 16 also moves forward to come in contact with the valve seat 15 to close the valve seat 15. When the second operating port 25*b* is opened and pressure fluid is supplied from the first operating port 25*a* into the first pressure chamber 24*a* as shown in FIG. 2, the piston 21 and the rod 16 move rearward. Therefore, the valve member 13 also moves rearward to separate from the valve seat 15 to open the valve seat 15.

The first heating mechanism 4 includes a heat-generating member 30 disposed inside of the valve casing 10 and along the rod 16 and a first heater 31 provided inside of the heat-generating member 30.

The heat-generating member 30 is made of metal material such as aluminum with an excellent heat-transfer property into a cylindrical shape, disposed concentrically around the rod 16 with a minute gap therebetween, and disposed immovably in a fixed position in the valve casing 10 by being fixed to the partition 17 with a bolt or the like. Within a wall thickness of the heat-generating member 30, one or a plurality of heater mounting hole(s) 30*b* is (are) constituted in parallel to the rod 16 and the rod-shaped first heater 31 of an electrical resistance heating type is mounted in each the heater mounting hole 30*b*.

A tip end portion of the heat-generating member 30 is constituted as an annular heat-transfer face 30*a* and the heating surface 30*a* comes in contact with a heat receiving face 33*a* constituted on a back face of the valve member 13 in opening of the valve member 13 to directly transfer heat to the valve member 13 in an open position. Therefore, the heat-generating member 30 functions both as means for heating the valve member 13 an as a stopper for determining an open position of the valve member 13.

The first heater 31 has a temperature sensor 32 and a lead wire 32*a* extending from the temperature sensor 32 is tied together with a lead wire 31*a* extending from the first heater 31 in a bundle, extends outside, and is connected to a heater control circuit (not shown).

The heat receiving face 33*a* of the valve member 13 is constituted on an end face of a heat receiving member 33 mounted to the back face of the valve member 13. In other words, to the back face of the valve member 13, the heat receiving member 33 made of material such as aluminum with an excellent heat-transfer property into a cylindrical shape is mounted to surround the rod 16. A tip end face of the heat receiving member 33 is constituted as the heat receiving face 33*a*. A base end portion of the heat receiving member 33 in contact with the valve member 13 is constituted into a flange-shaped large-diameter portion 33*b* and a heat-transfer member 35 for expansion and contraction is disposed between the large-diameter portion 33*b* and the heat-generating member 30. The heat-transfer member 35 is made of heat-transfer material such as aluminum into a form such as a bellows and a coil which can expand and contract and is disposed between both the members 30 and 33 with opposite ends of the heat-transfer member 35 in contact with or connected to the large-diameter portion 33*b* of the heat receiving member 33 and the heat-generating member 30 to constantly transfer heat from the heat-generating member 30 to the valve member 13.

Therefore, in the first heating mechanism 4, when the valve member 13 is in a closed position as shown in FIG. 1 or at some midpoint in opening/closing operations, the heat receiving face 33*a* of the valve member 13 and the heat-transfer face 30*a* of the heat-generating member 30 are at a distance from each other and therefore the valve member 13 is heated by the heat-generating member 30 through the heat-transfer member 35. When the valve member 13 is in an open position as shown in FIG. 2, the heat receiving face 33*a* and the heat-transfer face 30*a* are in contact with each other and therefore the valve member 13 is heated both by the heat-generating member 30 and the heat-transfer member 35.

A bellows 36 for expansion and contraction is mounted between the partition 17 of the valve casing 10 and the valve member 13 and the heat-generating member 30, the heat receiving member 33, and the heat-transfer member 35 are respectively housed inside the bellows 36.

The second heating mechanism 5 is mounted to an outer face of the valve casing 10 and constituted as follows. The second heating mechanism 5 has a prism-shaped heat-transfer cover 40 attached to the valve casing 10 to surround the whole outer peripheral face of the valve casing 10. The heat-transfer cover 40 is made of hard material such as aluminum with an excellent heat-transfer property to have a measure of wall thickness and is mounted in close contact with the outer face of the valve casing 10. The whole heat-transfer cover 40 may be constituted integrally or the heat-transfer cover 40 may be constituted by combining a plurality of parts, e.g., separate parts respectively corresponding to four sides of the valve casing 10.

Within the wall thickness of the heat-transfer cover 40, a plurality of heater mounting holes 40*a* are constituted in parallel to an axis of the valve casing 10 and a rod-shaped second heater 41 is inserted into each the heater mounting hole 40*a*. Heat from the second heater 41 is evenly dispersed through the heat-transfer cover 40 and is evenly transferred to the whole valve casing 10. The second heater 41 also has a temperature sensor 42 and a lead wires 41*a* and 42*a* extending from the second heater 41 and the temperature sensor 42 are tied in a bundle, extend outside, and are connected to a heater control circuit (not shown).

The second heaters 41 may be disposed in four corners of the heat-transfer cover 40 or at central portions of the respective sides. The number of the second heaters 41 is not limited to four and may be three or less, five or more, or only one depending on heating conditions.

To an outside of each side of the heat-transfer cover 40, a heat insulating cover 43 for preventing heat transfer from each the side to an outside is mounted. The heat insulating cover 43 is constituted by mounting a thin heat diffusing plate 43*b* having a function of diffusing heat from the heat-transfer cover 40 to an inner face of a heat insulating plate 43*a* in a shape of a flat plate and made of silicon rubber, fluoric rubber, foamed fluoric rubber, or the like. The heat insulating cover 43 is fixed to each the side of the heat-transfer cover 40 by screws 46 while maintaining a constant gap 45 between the heat-transfer cover 40 and itself by providing a spacer 44 therebetween. In this case, it is preferable that part of the screws 46 of the heat insulating cover 43 is also used for fixing the second heater 41 by bringing tip ends of the screws 46 into contact with the second heater 41.

Although the heat diffusing plate 43*b* can be made of heat-transfer material such as aluminum, it can be made of other materials. The heat insulating cover 43 may be separated into four parts corresponding to respective sides of the heat-transfer cover 40 or may be constituted into an integral body.

Because the second heating mechanism 5 has the above structure, heat from the second heater 41 is evenly dispersed to the entire cover through the heat-transfer cover 40 and is evenly transferred to the entire outer peripheral face of the valve casing 10. As a result, though the valve casing 10 is made of material such as SUS with an inferior heat-transfer property, it is possible to efficiently heat the entire outer peripheral face of the valve casing 10 by the inexpensive rod-shaped heaters 41 through the heat-transfer cover 40 and adhesion of a reaction product to an inner face of the valve casing 10 can be prevented reliably.

Furthermore, the heat insulating portion 3 is constituted of a cylindrical heat insulating plate 48 having a plurality of air vents 48*a*, the heat insulating plate 48 is disposed concentrically between the valve casing 10 and the cylinder 20 to surround the rod 16, and the rod 16 is cooled by air circulating in the heat insulating plate 48. From some of the air vents 48*a* of the heat insulating plate 48 or a specially-provided lead-through hole, the lead wire 31*a* of the first heater 31 is lead outside.

In the poppet valve having the above structure, the heat-generating member 30 is disposed in the fixed position in the valve casing 10, the first heater 31 is mounted to the heat-generating member 30, the heat-generating member 30 and the valve member 13 are connected to each other by the heat-transfer member 35, and the heat-generating member 30 and the valve member 13 come in contact with each other in opening of the valve member 13. Therefore, even when the valve member 13 is at the closed position or at some midpoint in the opening/closing operation and is at a distance from the heat-generating member 30, the valve member 13 is constantly heated through the heat-transfer member 35 and adhesion of the product from the working fluid can be prevented reliably. When the valve member 13 is at the open position and a large amount of working fluid circulates through the flow path, the valve member 13 directly comes in contact with the heat-generating member 30 and is heated not only by the heat-transfer member 35 but also and directly by the heat-generating member 30. Therefore, heating efficiency is increased and a product adhesion preventing effect is enhanced.

Because the first heater 31 is disposed at a place other than the valve member 13 by being mounted to the heat-generating member 30, it is possible to avoid problems such as an increase in a driving force for opening and closing and a degradation in responsiveness due to an increase in weight of the valve member, the problems occurring in a conventional product in which such a heater is directly mounted to the valve member. Vibrations, expansion/contraction resistance, and the like of the lead wires extending from the heaters do not affect opening/closing of the valve member.

Although the valve casing 10 in the shape of the square pole is shown in the above embodiment, the shape of the valve casing 10 is not limited to the square pole and may be a circular-cylindrical shape or other shapes. In this case, it is needless to say that the heat-transfer cover 40 and the heat insulating cover 43 in the second heating mechanism 5 are constituted into shapes adaptable to such a shape.

Although a heater is not mounted to the valve member 13, it is possible to mount an auxiliary heater of such a small size as not to significantly affect opening/closing of the valve member 13. Moreover, although the cylinder operating portion 2 of a double acting type in which the piston 21 is driven by fluid pressure both for going and returning is shown, it is needless to say that the cylinder operating portion 2 may be of a single acting type in which a return operation is carried out by a spring.

As described above, according to the invention, by mounting the first heater for heating the valve member to the heat-generating member disposed at the place other than the valve member and connecting the heat-generating member and the valve member by the heat-transfer member for expansion and contraction, the valve member can constantly be heated through the heat-transfer member irrespective of the position of the valve member during the opening/closing operations. It is possible to prevent problems such as the increase in the driving force for opening and closing and the degradation in responsiveness due to the increase in weight of the valve member.

What is claimed is:

1. A poppet valve with a heater, the valve comprising:

a valve casing including a first main port and a second main port, a flow path connecting both the main ports, and a valve seat provided in the flow path;

a cylinder connected to the valve casing;

a poppet-type valve member provided in the valve casing to open and close the valve seat;

a rod having a tip end portion connected to the valve member and a base end portion on an opposite side and extending into the cylinder;

a piston disposed for sliding in the cylinder and connected to the base end portion of the rod;

a heat-generating member disposed in a fixed position in the valve casing and having at its tip end portion a heat-transfer face with which the valve member comes in contact in an open position;

a heat-transfer member disposed for expansion and contraction in response to an operation of the valve member between the heat-generating member and the valve member to constantly transfer heat from the heat-generating member to the valve member; and a first heater mounted to the heat-generating member.

2. A poppet valve according to claim 1, wherein a cylindrical heat receiving member surrounding the rod and having a heat-transfer property is mounted to a back face of the valve member, a heat receiving face with which the heat-transfer face of the heat-generating member comes in contact is constituted at a tip end of the heat receiving member, and the heat-transfer member is connected to the heat receiving member and the heat-generating member.

3. A poppet valve according to claim 1, wherein the heat-generating member is in a cylindrical shape and disposed concentrically around the rod and the first heater is mounted in the heat-generating member.

4. A poppet valve according to claim 2, wherein the heat-generating member is in a cylindrical shape and disposed concentrically around the rod and the first heater is mounted in the heat-generating member.

5. A poppet valve according to claim 1, wherein the heat-transfer member is in a shape of a bellows or a coil.

6. A poppet valve according to claim 2, wherein the heat-transfer member is in a shape of a bellows or a coil.

7. A poppet valve according to claim 3, wherein the heat-transfer member is in a shape of a bellows or a coil.

8. A poppet valve according to claim 4, wherein the heat-transfer member is in a shape of a bellows or a coil.

9. A poppet valve according to claim 1, wherein a bellows is provided between a partition at an end portion of the valve casing and the valve member to surround the rod and the heat-generating member, the heat receiving member, and the heat-transfer member are housed in the bellows.

10. A poppet valve according claim 1, wherein the valve casing includes a second heater.

11. A poppet valve with a heater, the valve comprising:

a valve casing including a first main port and a second main port, a flow path connecting both the main ports, and a valve seat provided in the flow path;

a valve member provided in the valve casing to open and close the valve seat;

a rod for driving the valve member;

a heat-generating member disposed in a fixed position in the valve casing and having at its tip end portion a heat-transfer face with which the valve member comes in contact in an open position;

a heat-transfer member disposed for expansion and contraction in response to an operation of the valve member between the heat-generating member and the valve member to constantly transfer heat from the heat-generating member to the valve member;

a first heater mounted to the heat-generating member; and a bellows provided between a partition at an end portion of the valve casing and the valve member and housing the rod, the heat-generating member, the heat receiving member, and the heat-transfer member.

12. A poppet valve according to claim 11, wherein a cylindrical heat receiving member surrounding the rod and having a heat-transfer property is mounted to a back face of the valve member, a heat receiving face with which the heat-transfer face of the heat-generating member comes in contact is constituted at a tip end of the heat receiving member, and the heat-transfer member is connected to the heat receiving member and the heat-generating member.

13. A poppet valve according to claim 11, wherein the heat-generating member is in a cylindrical shape and disposed concentrically around the rod and the first heater is mounted in the heat-generating member.

14. A poppet valve according to claim 12, wherein the heat-generating member is in a cylindrical shape and disposed concentrically around the rod and the first heater is mounted in the heat-generating member.

15. A poppet valve according to claim 11, wherein the heat-transfer member is in a shape of a bellows or a coil.

* * * * *